Sept. 16, 1930.    J. S. DONALDSON    1,776,111
AIR PORT
Filed Aug. 30, 1928
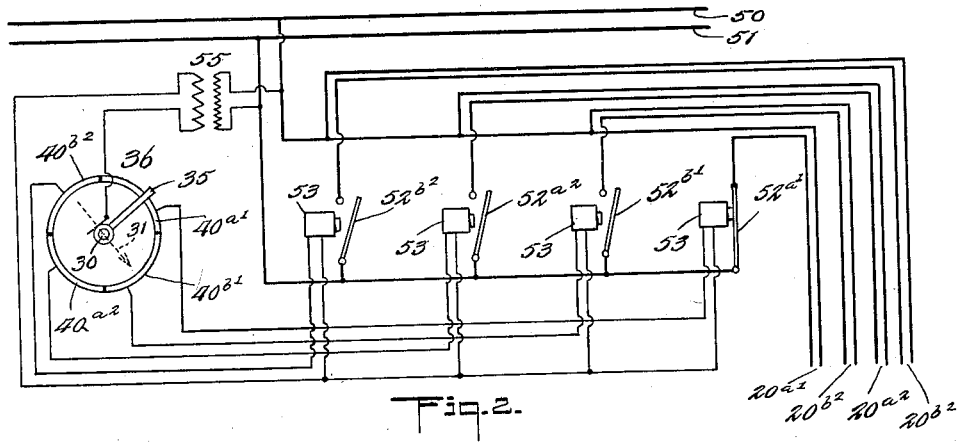
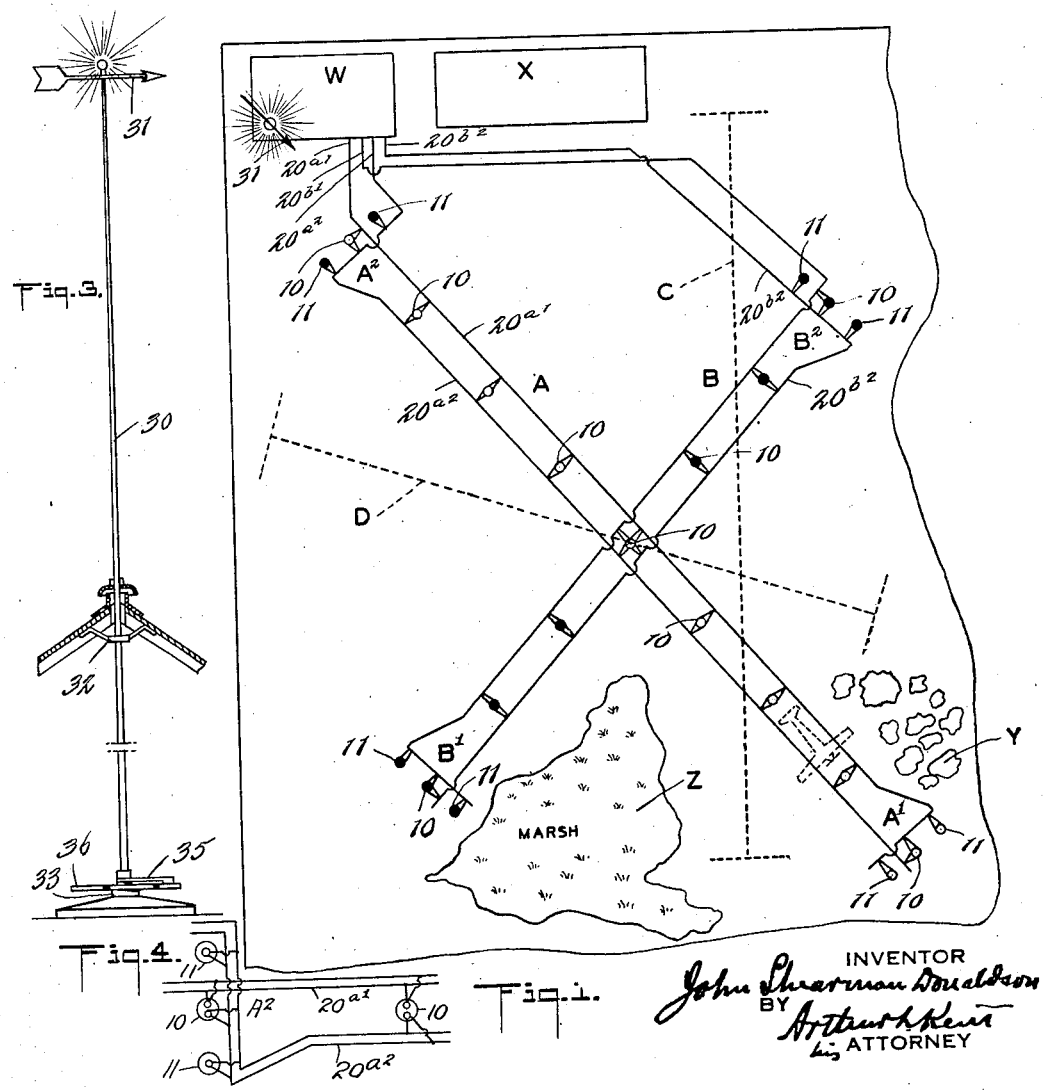
INVENTOR
John Shearman Donaldson
BY Arthur L. Kent
his ATTORNEY Patented Sept. 16, 1930

1,776,111

UNITED STATES PATENT OFFICE

JOHN SHEARMAN DONALDSON, OF NEW YORK, N. Y., ASSIGNOR, BY MESNE ASSIGNMENTS, TO AIRPORT LIGHTING, INC., OF NEW YORK, N. Y., A CORPORATION OF DELAWARE

AIRPORT

Application filed August 30, 1928. Serial No. 302,965.

This invention relates to air ports. The object of the invention is to provide means for indicating to aviators where and in which direction to land.

The invention comprises means for indicating visually to an aviator approaching and about to make a landing the runway, or strip of the landing surface, on which to land and the direction in which to approach and land on such runway.

Although the invention as to most of its features is applicable to marine as well as to land air ports, the invention has been made primarily with the idea of providing indicating or signaling means for land air ports, or landing fields, and certain features of the invention are especially applicable to such landing fields. The invention will, therefore, for convenience be described more particularly with regard to its application to landing fields.

An airplane in landing should be moving as nearly as possible against the wind. Because of obstructions on the landing surface, such as trees, buildings, or marshy or wet places in the ground, or elevations or depressions in the ground of a landing field, a suitable surface of the necessary length can, in many fields, be found only in certain directions and locations on the field. It is desirable that an aviator approaching a field or a marine air port to make a landing shall be able to pick out readily the runway on which to land and to judge accurately his distance vertically from the landing surface as he approaches it, and shall know the direction in which to land thereon and the length of the runway.

Indicating means according to the present invention show the approaching aviator the location of the runway on which to land, the wind direction, the length of the runway, and the level, or location vertically, of the landing surface. The invention finds its greatest usefulness in giving information for night landing, although some features of the invention are useful in daylight.

According to the invention, the landing field is provided with visual runway-indicating and direction-indicating devices for showing each runway of the field and the direction in which to land thereon, and these indicating devices are selectively operated to indicate the runway which is to be used and the direction in which landing is to be made, the selection depending, usually, on the direction in which the wind is blowing. The selecting devices may be operated or controlled manually, but an important feature of the invention consists in means for selectively operating the indicators automatically according to the wind direction.

For giving information for night landing, lamps are used for the indicating devices and are most desirably electrically illuminated lamps set substantially flush with the landing surface. For landing fields, the lamps are set in the ground so that they do not obstruct the landing surface. Lines of lamps are set to mark each runway, usually a single line of lamps set in each runway on a landing field, and other lamps are set at the ends of each runway to serve as direction indicators for showing in which direction on the runway landing is to be made.

The lamps may show any desired color or plain white light; and the direction-indicating lamps may be of the same color as the runway-marking lamps, or of different color. I prefer to use green lights with white borders for both the runway markers and the direction indicators, and to set the direction-indicating lamps in a line extending across the end of the line of runway-indicating lamps so as to form a T head at each end of each runway; and in some cases I consider it desirable to use for the direction indicators lamps of somewhat greater power than the lamps used for showing the runways.

When the apparatus is in operation, the runway-indicating lamps of the runway which is to be used are lighted, and the direction-indicating lamps forming the T at the end of this runway toward the direction from which the wind is blowing are also lighted, the direction-indicating lamps at the other end of this runway and the direction-indicating lamps of the other runways being dark, and the runways-indicating lamps of the other runways also being dark if the runways are being lighted selectively.

The runway-indicating lamps, or other runway markers used, are set a fixed uniform distance apart so that the aviator, knowing this distance, will be able quickly to determine the length of the runway from the number of markers in the line showing the runway. This distance between runway-indicating markers should, desirably, be standardized and used on all fields equipped with such runway-indicating markers.

A full understanding of the invention can best be given by a detailed description of an illustrative embodiment of the invention as applied to a landing field, or land air port, in the form and arrangement now considered best, and such a description will now be given in connection with the accompanying drawings, in which:

Fig. 1 is a diagrammatic plan of a landing field equipped with runway-marking and direction-indicating lamps according to the invention;

Fig. 2 is a diagram of the circuit-controlling apparatus;

Fig. 3 is a view of the wind-operated controlling means; and

Fig. 4 is a detail diagram illustrating connections from the supply cables to the lighting units in the lamps.

Referring to the drawings, Fig. 1 shows a landing field on which there are various obstructions, such as the administration building W, hanger X, trees Y, and marshy ground Z. The field, as shown, is laid out with two runways, A and B, each marked by a row of electric lamps 10 extending along the middle line of the runway and set in the ground so as not to interfere with the running of a plane on the ground over them. The runways are of different lengths, but the lamps 10 of both runways are placed a uniform distance apart so that, this distance between the lamps being known, a pilot approaching the field will know the length of the runway from the number of lamps in the runway. Any suitable distance for the spacing of the runway-marking lamps, such as 50 or 75 or 100 feet, for example, may be adopted as a standard.

At each end of each runway, direction-indicating lamps 11 are set in the ground in a line extending transversely of the line of runway-marking lamps so as to form a T at each end of each runway. Usually, two such direction-indicating lamps will be sufficient at each end of each runway, one on either side of the end lamp 10. They will be spaced a suitable distance, 25 feet for example, from the end lamp 10, and may be of the same color as the lamps 10 or of a different color, and of the same or different power. Preferably the lamps 10 and 11 all show green light with white border, with the lamps 11 somewhat more powerful than the lamps 10.

Cables $20^{a'}$, $20^{a2}$, $20^{b'}$, $20^{b2}$ for supplying current to the lamps 10 and 11 are laid beneath the surface of the ground and connected each to the particular lamps which it is to supply with current. The wires of the cable $20^{a'}$ are, as shown, connected to supply all the runway-marking lamps of the runway A and the direction-indicating lamps at the end A' of the runway A. The cable $20^{a2}$ has its wires connected to light all the lamps 10 of the runway A, and the direction-indicating lamps 11 at the end $A^2$ of this runway. Similarly, the cable $20^{b'}$ serves to light the lamps 10 of the runway B and the lamps 11 at the end B' of this runway, and the cable $20^{b2}$ serves to light the lamps 10 of the runway B and the lamps 11 at the end $B^2$ of this runway.

By supplying lighting current through the proper one of the cables 20, the proper lamps may be lighted to indicate to an approaching aviator the runway on which he is to land and the direction he is to land on such runway. Thus, if current is supplied through the cable $20^{a'}$, the runway A will be lighted and the direction-indicating lamps 11 at the end A' will be lighted. The other lamps being dark, the aviator will have his landing runway and landing direction clearly indicated.

The runway-marking lights set substantially flush with the surface of the field not only serve to indicate the location of the runway but also fix for the pilot as he lands the landing surface level, that is, the position vertically below him of the horizontal plane or surface to which he is descending. Runway-marking lights set substantially flush with the surface of the water of a marine air port would obviously serve the same purpose.

With the wiring system shown in Figs. 1 and 2, connections from the two-wire cables 20 to the incandescent lights or other lighting units of the lamps, may be made as shown in detail in Fig. 4.

Any suitable means may be provided for selectively controlling the supply of lighting current to the several cables 20. The selection will usually be in accordance with the wind direction so as to indicate to the aviator where and in which direction to land in order to land most nearly against the wind. Most desirably, the supply of current to the lighting cables is controlled automatically according to the wind direction, and the invention includes wind-controlled automatic circuit-controlling apparatus for this purpose.

The wind-operated controlling means shown in the drawing comprises a freely turning vertical shaft 30 which is turned according to the wind direction by means of a weather vane 31. This weather vane shaft may be mounted in any suitable manner in any suitable location, as, for example, on the top of a building such as the administration building W, as shown in Fig. 1, being supported in suitable bearings 32 and 33. Near its lower end, the shaft carries a contact arm 35 positioned to move over and make contact with a circular contact member 36.

The contact member 36 has, as shown in Fig. 3, a plurality of electrically separated arc-shaped contacts, the number and relative length of which will depend on the number and relative direction of the runways on the field. As shown, there are four of these contact pieces, 40$^{a'}$, 40$^{b'}$, 40$^{a2}$, 40$^{b2}$, which are so positioned with relation to the direction of the contact arm 35 relatively to the wind vane 31 that when the wind is blowing in the direction to blow down the runway A from the end A' to the end A², or more nearly in that direction than in a direction parallel to the runway B, the contact arm 35 is in contact with the contact piece 40$^{a'}$; and when the wind is blowing more nearly in the direction of the runway B from its end B' to its end B² than in a direction parallel to the runway A, the contact arm will be in contact with the contact piece 40$^{b'}$; and so for the other wind directions.

The contact of the arm 35 with the contact pieces 40 may be utilized in various ways to control the supply of current to the different lighting cables 20. Most desirably, and as shown, the control is through a system of relays in order that a high voltage current may be supplied to the lamps while, to avoid arcing, a low voltage current is passed through the arm and contact pieces.

A convenient arrangement for this purpose is shown diagrammatically in Fig. 2. As shown in this diagram, a high tension electric current supplied over mains 50 and 51 is supplied to the lamp-lighting cables 20$^{a'}$, 20$^{b'}$, 20$^{a2}$, 20$^{b2}$ through switches 52$^{a'}$, 52$^{b'}$, 52$^{a2}$, 52$^{b2}$, each of which is operated by an electro-magnet 53. The electro-magnets 53 are connected in four branches of a low voltage control circuit which is supplied with current through a transformer 55. The contact arm 35 and contact pieces 40 are connected in this control circuit in such manner that when the arm 35 is in contact with the contact piece 40$^{a'}$ the electro-magnet 53 of the switch 52$^{a'}$ is energized to operate the switch to close the circuit to the lighting cable 20$^{a'}$, and that when the arm 35 is in contact with the contact piece 40$^{b'}$ the electro-magnet 53 of the switch 52$^{b'}$ is energized to operate the switch to close the circuit to the lighting cable 20$^{b'}$, and so forth.

In order that there shall be no time when, because of the contact arm 35 being positioned between two of the contact pieces 40, none of the indicating lamps are lit, the contacting portion of the arm 35 is made to bridge the space between adjacent contact pieces so that before the arm moves out of contact with one of the contact pieces it will have made contact with the adjacent contact piece. This may result at times in having two runways lighted at the same time when the wind is blowing from a direction midway between the line directions of such two runways. In such a case, however, either runway is as good as the other for landing, and this condition will not often occur.

For simplicity in illustration and description, I have shown and described a landing field having only two runways, providing four landing directions. It is desirable that landing fields should have a greater number of runways extending in different directions, so that landings may in all cases be made more nearly in the direction against the wind than may at times be possible with a field having only two runways. The present invention is obviously adaptable to a field having any desired number of runways in any relative location and extending in any relative directions to each other. The field shown in Fig. 1 might, for example, have two additional runways, as indicated by dotted lines C and D, and these additional runways could be provided with runway-marking lamps and direction-indicating lamps, as shown and described for the runways A and B. For more than two runways, the circuit-controlling apparatus is correspondingly modified. The contact member 36 will always have a number of the contact pieces 40 corresponding to the number of lighting circuits, and the relative lengths of these contact pieces will be determined by the directions of the runways. With only two runways, providing four landing directions, the four contact pieces will be of equal length whatever the angular relation of the runways. But for three or more runways of non-uniform angular relation, the contact pieces would be of differing lengths.

By the expression "set in the ground" as used herein, it is meant that the light, or lamp, so described, is set down into the ground so that the light will show substantially flush with the adjacent surface of the ground and that no part of the lamp or its setting or protective covering projects sufficiently above the adjacent ground surface to obstruct or interfere with the passage over it of any part of the landing gear of an airplane.

Expressions in the claims such as "indicating the available runway length" are intended to imply the giving of information as to the lengthwise extent in units of length, as distinguished from merely showing the location of the limits of the runway.

It will be understood that the invention is not to be limited to the exact construction and arrangement of indicators and control apparatus shown but that it includes changes and modifications thereof within the claims. For example, instead of a single row of lights for marking each runway set in the ground in a line extending along the center of the runway, other arrangements of the marking lights might be used and other indicating devices might be employed. In a marine landing port, lights would usually not be set along the center of a runway, but would most desirably be set in two lines marking the sides of the runway.

Parts and features of the invention as claimed may, of course, be used independently of other features.

What is claimed is:

1. An air port having visual means for marking a runway and indicating the available landing length thereof.

2. An air port having visual means for indicating landing direction and available runway length.

3. An air port having visual means for indicating the location of a runway, the landing direction and available runway length.

4. An air port, having visual means for marking runways and indicating available runway length in a plurality of landing directions, and means for selectively operating said visual means to indicate a particular landing direction and available runway length in that direction.

5. An aviation field, having a plurality of runways, and provided with indicating means comprising visual runway-marking means extending along the length of each runway and indicating an available landing length thereof, and visual direction-indicating means at each end of each runway, and means for selectively operating said runway-marking and direction-indicating means to indicate the runway to be used and the direction in which to land thereon and the available landing length.

6. An aviation field, having runway-marking and direction-indicating lamps set in the ground, and means for selectively lighting said lamps to indicate the runway and the direction in which to land thereon and the available landing length.

7. Air port indicating means, comprising visual means for marking a runway and indicating the available landing length thereof.

8. Air port indicating means, comprising visual means for marking runways and indicating available runway length in a plurality of directions, and means for selectively operating said visual means to indicate a particular direction and available runway length in that direction.

9. Air port indicating means, comprising visual means for marking a plurality of runways and indicating available landing lengths thereof, visual direction-indicating means associated with each runway, and means for selectively operating said visual means to show the runway to be used and the direction in which to land thereon.

10. Air port indicating means, comprising lighting means marking a runway and indicating an available landing length thereof.

11. Air port indicating means, comprising lighting means for marking a plurality of runways and indicating available landing lengths thereof, and means for selectively lighting said lighting means to show the runway to be used.

12. Air port indicating means, comprising lines of spaced visual indicators marking a plurality of runways and extending along a landing length thereof, and means for selectively operating said indicators to show the runway to be used.

13. Air port indicating means, comprising lines of spaced visual indicators marking and extending along a landing length of a plurality of runways, visual direction indicators at the ends of each runway, and means for selectively operating said indicators to show the runway to be used and the direction in which to land thereon.

14. Air port indicating means, comprising lines of spaced visual runway indicators for marking a plurality of runways and indicating available landing lengths thereof, and direction indicators at the ends of each runway, and wind-controlled means for operating said indicators to indicate which runway is to be used and the direction in which to land thereon.

15. Indicating means for an aviation field having a plurality of runways, comprising visual runway-marking means extending along a landing length of each runway, and direction-indicating means associated with each runway, and wind-controlled means for selectively operating the runway-marking and direction-indicating means to indicate the runway to be used and the direction in which to land thereon.

16. Air port indicating means, comprising a plurality of runway-marking lamps spaced along a landing length of each of a plurality of landing runways, and means for selectively lighting the lamps to show the runway to be used.

17. Air port indicating means, comprising uniformly spaced runway-indicating lamps for marking and indicating the landing length of a plurality of landing runways, direction-indicating lamps for each runway, and controlling means for selectively lighting the lamps to indicate the runway to be used and the direction in which to land thereon.

18. Aviation field indicating means, comprising a plurality of ground markers arranged to mark and show the landing lengths of a plurality of landing runways, a direction-indicating device at each end of each runway, and means for operating the direction-indicating device at that end of the runway to be used toward which landing is to be made on the runway.

19. Air port indicating means, comprising a line of uniformly spaced lamps to indicate the length of a runway, a direction-indicating lamp at each end of the runway, and means for lighting the direction-indicating lamp toward which landing is to be made.

20. An aviation field having a line of uniformly spaced lamps set in the ground in a runway to indicate the length of the runway, a direction-indicating lamp set in the ground at each end of the runway, and means for lighting the direction-indicating lamp toward which landing is to be made.

21. An aviation field having a line of uniformly spaced lamps set in the ground in a runway to indicate the available length of the runway.

22. Air port indicating means, comprising a line of uniformly spaced runway-marking lights extending along a landing length of the runway and set substantially flush with the landing surface.

23. Aviation field indicating means, comprising a plurality of lines of spaced lamps set in the ground to mark a plurality of landing runways and indicate available landing lengths thereof, and selective controlling means for lighting the lamps of a runway to be used.

24. Aviation field indicating means, comprising spaced runway-indicating lamps set in the ground to mark a plurality of landing runways and indicate available landing lengths thereof, a direction-indicating lamp at each end of each runway, and controlling means for selectively lighting the lamps to indicate the runway to be used and the direction in which to land on such runway.

25. Aviation field indicating means, comprising a plurality of lines of spaced lamps set in the ground to mark a plurality of landing runways, direction-indicating lamps at each end of each runway set in a line extending transversely of the line of runway-marking lamps, and means for selectively lighting the runway-marking lamps and the direction-indicating lamps to indicate the runway to be used and the direction in which to land thereon.

26. Aviation field indicating means, comprising a line of spaced lamps set in the ground to mark a landing runway, direction-indicating lamps at each end of the runway set in a line extending transversely of the line of runway-marking lamps, and means for lighting the runway-marking lamps and for selectively lighting the direction-indicating lamps to indicate the direction in which to land on the runway.

27. Aviation field indicating means, comprising a plurality of lines of runway-indicating lamps set in the ground to mark a plurality of landing runways of different lengths, the lamps being spaced the same uniform standard distance apart on all the runways to serve as distance indicators, showing the available landing length of each runway.

28. Aviation field indicating means, comprising a line of runway-indicating lamps set in the ground, the lamps being spaced a uniform standard distance apart to serve as distance indicators showing an available landing length of the runway.

29. Air port indicating means, comprising a line of runway-indicating lights spaced a uniform standard distance apart to serve as distance indicators showing an available landing length of the runway.

30. Air port indicating means, comprising a line of spaced visual indicators set in a line extending longitudinally of a runway to mark the runway and indicate the available runway length.

In testimony whereof I have hereunto set my hand.

JOHN SHEARMAN DONALDSON.